Jan. 9, 1951 W. H. DRAKE 2,537,882
GATHERING DEVICE FOR SPANISH MOSS
Filed July 24, 1947 6 Sheets-Sheet 1
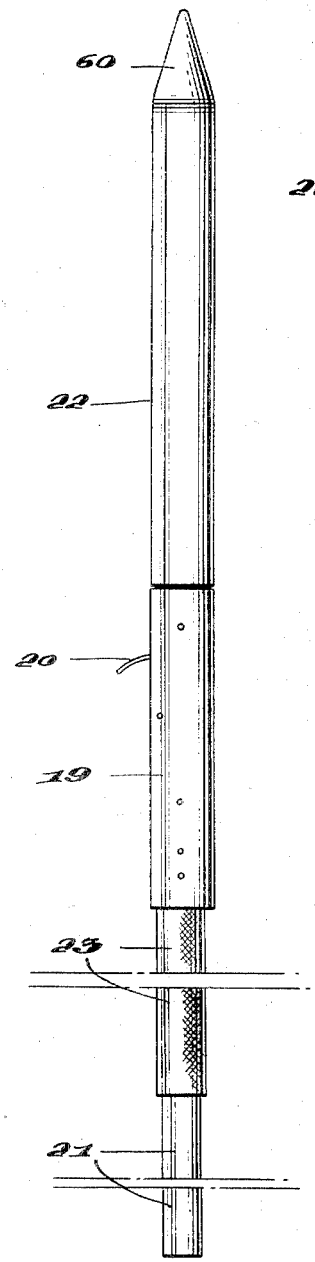
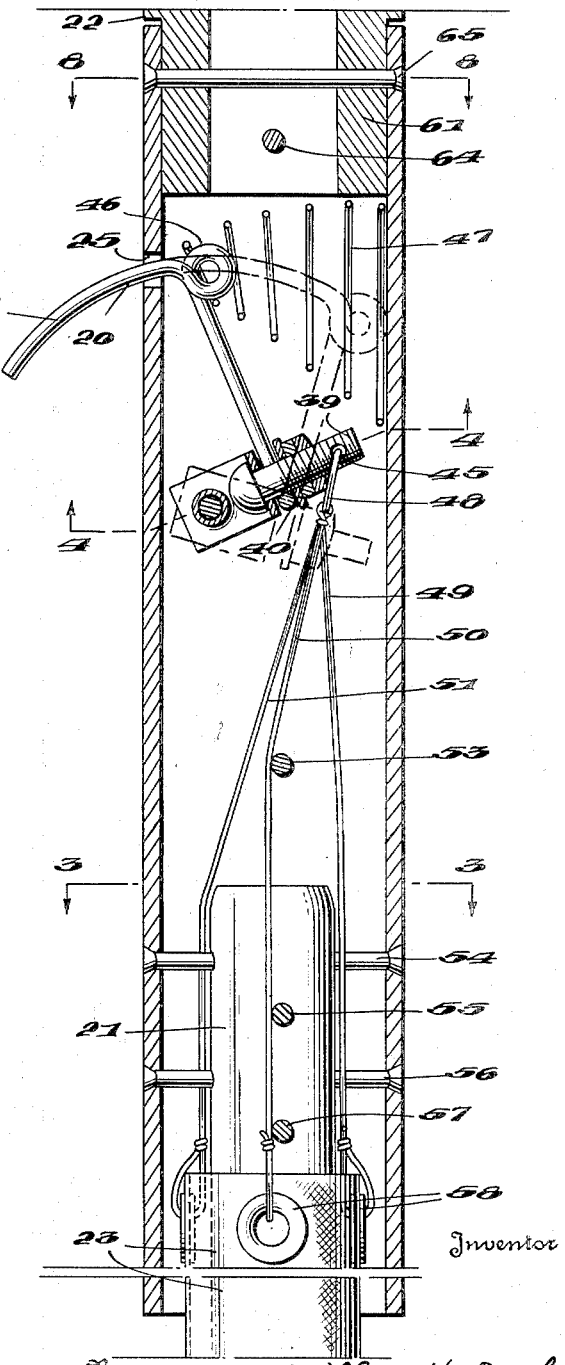
Inventor
William H. Drake
By Leech & Radue Attorneys Jan. 9, 1951 W. H. DRAKE 2,537,882
GATHERING DEVICE FOR SPANISH MOSS
Filed July 24, 1947 6 Sheets-Sheet 2
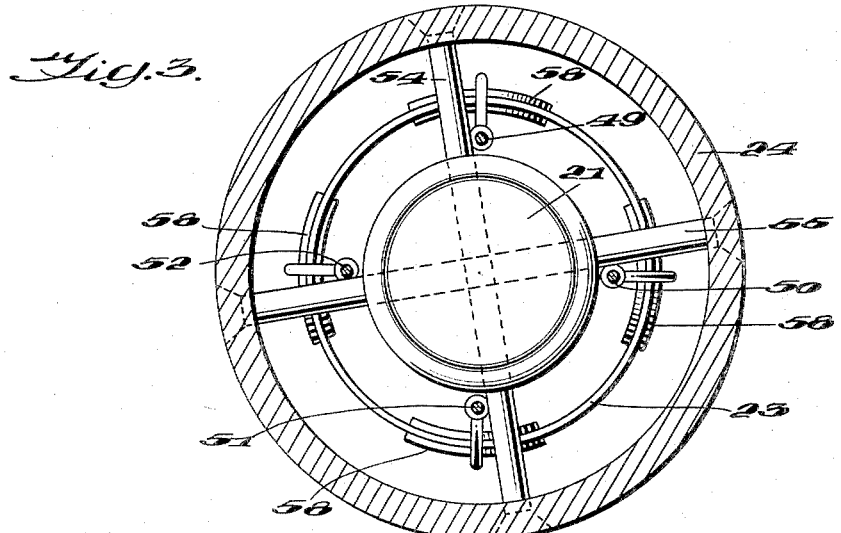
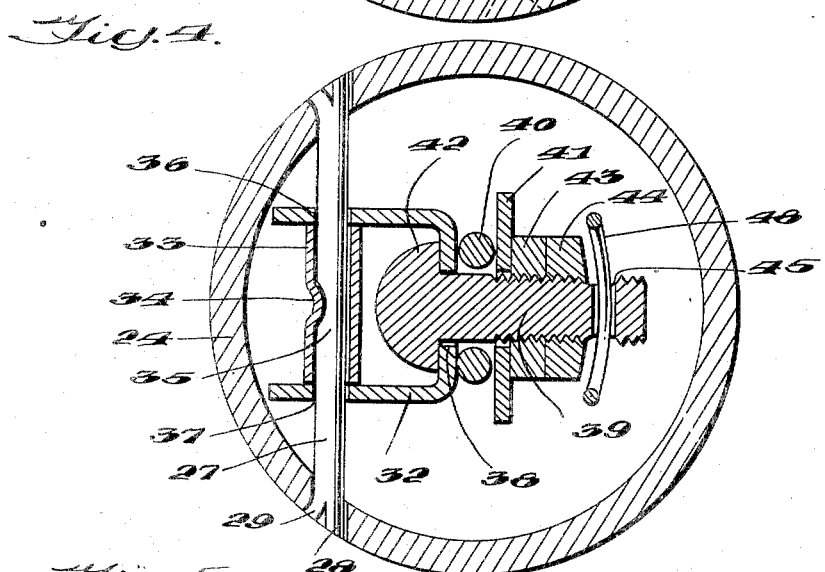
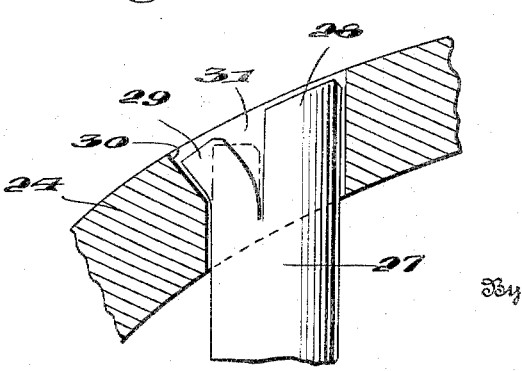
Inventor
William H. Drake
By Leech & Radue
Attorneys

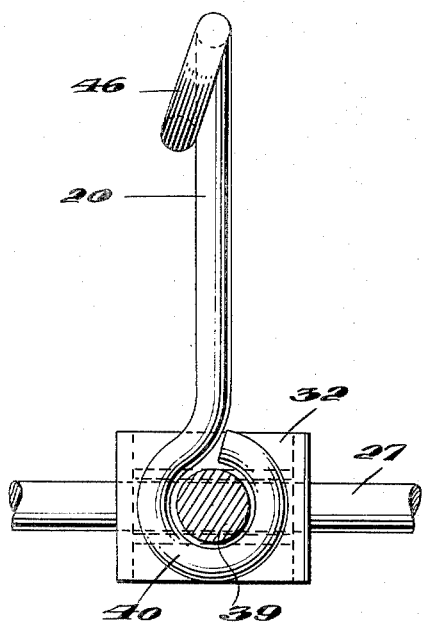
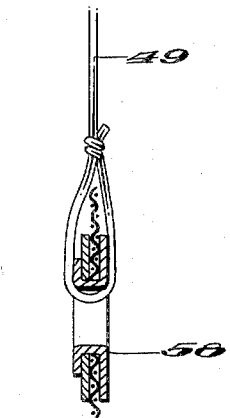
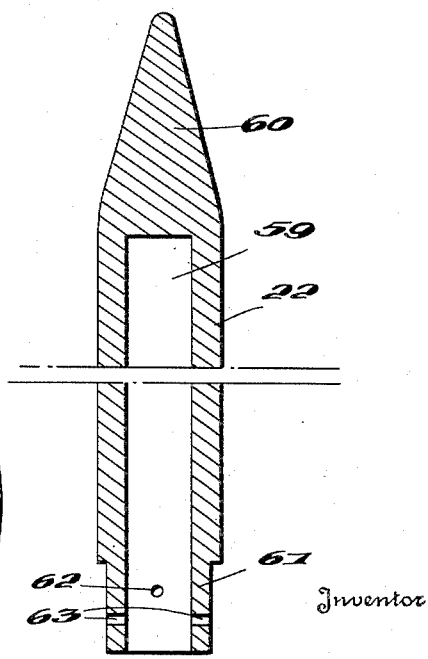
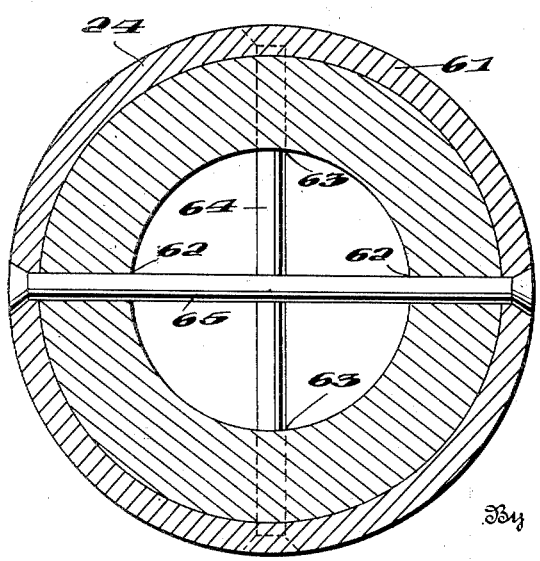

Jan. 9, 1951 W. H. DRAKE 2,537,882
GATHERING DEVICE FOR SPANISH MOSS
Filed July 24, 1947 6 Sheets-Sheet 4

Inventor
William H. Drake
By Leech & Radus
Attorneys

Jan. 9, 1951 W. H. DRAKE 2,537,882
GATHERING DEVICE FOR SPANISH MOSS
Filed July 24, 1947 6 Sheets-Sheet 5
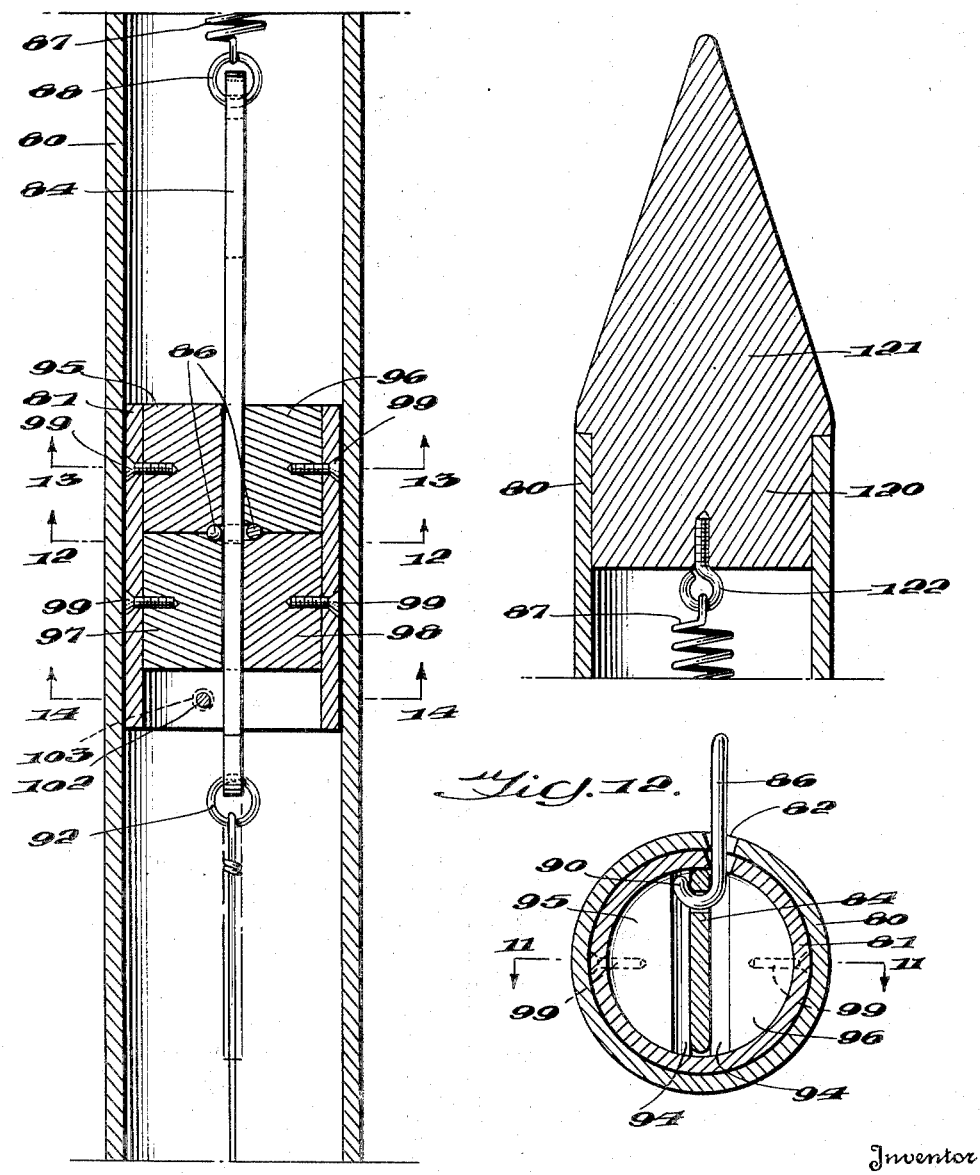
Inventor
William H. Drake
By Leech & Radue
Attorneys

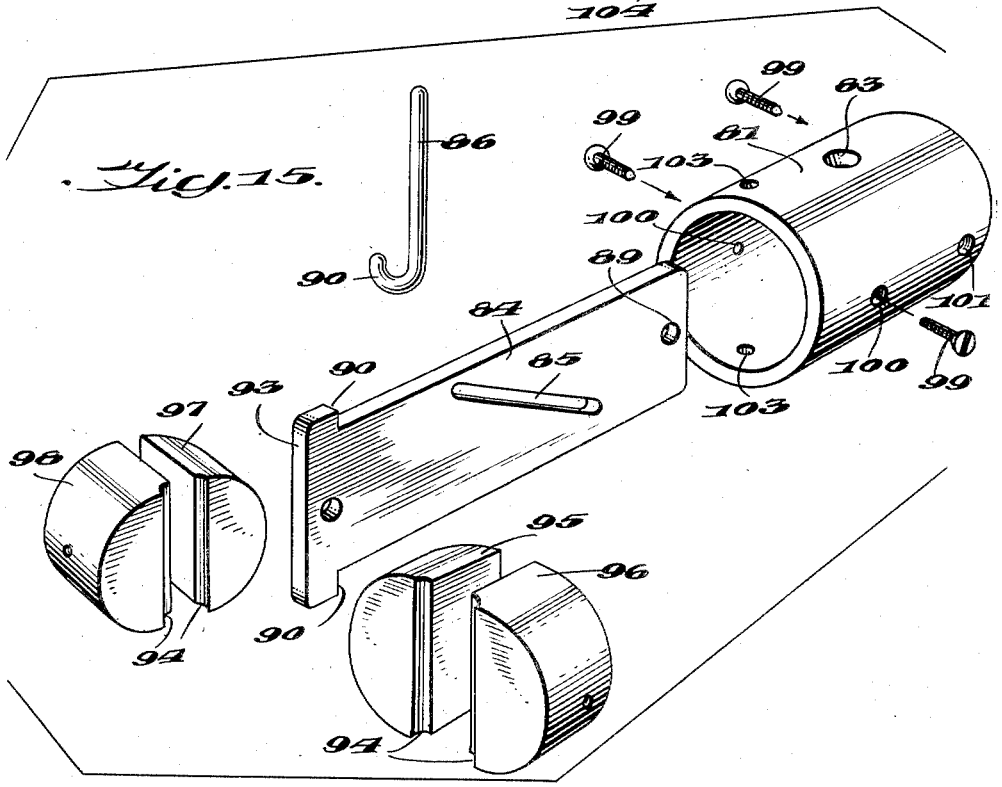

Patented Jan. 9, 1951

2,537,882

UNITED STATES PATENT OFFICE 2,537,882

GATHERING DEVICE FOR SPANISH MOSS

William H. Drake, Ocala, Fla.

Application July 24, 1947, Serial No. 763,425

10 Claims. (Cl. 47—1)

My invention is a gathering device especially designed for gathering streamers or pendants of Spanish moss from the limbs of trees by manual operation of the device. It is applicable to other fibres such as to some underwater vegetation that may be wound around the pole and then pulled loose.

At the present time most operators when moss gathering, use poles with a fixed projection at one end of the pole usually approximately perpendicular to the axis of the pole. Sometimes the free end of the projection extends somewhat downward toward the base of the pole as well as outward. With this pole having a fixed projection or gathering pin, the operator spends about one-third of his time entwining moss upon the pole, one-third in pulling the moss loose from the limb and lowering it within reach, and one-third in unwinding or forcibly tearing the partially coiled tuft of moss from the pole.

The object of my invention is to provide a gathering device that can be used to entwine moss in the accustomed maner as if with a fixed-pin pole, but that can further release the coil of moss without complete lowering of the gathering head and without untwisting or tearing of the fibres.

Another object of my invention is to provide a gathering spindle whose projecting gathering pin will retract to a position substantially flush with or countersunk below the surface of the gathering spindle.

Still another object of my invention is to provide a shaft for fibre gathering having a retractable gathering pin which is controlled from a zone near the base of the shaft without obstruction by the shaft or any of the controlling mechanism to stop the coil of fibre from sliding down and off the end of the pole during the retraction-extension cycle of the gathering pin.

Still another object of my invention is to provide a gathering shaft device in which the gathering head is controlled from gathering to release position by a hand grip located far enough from the base of the shaft to permit the operator to hold the shaft near its end with both hands during the turning of the shaft yet having the hand grip near enough to the end to make it accessible to the upper hand of the operator as he lowers the pole slightly to a more balanced position.

Still another object of my invention is to provide above the gathering pin a sufficient shaft length to wind on enough moss to be gripped by it even when the shaft is almost vertical and tends to wind the moss off the end.

Still another object of my invention is to provide a housing with a retractable pin and internal controls constructed so that the housing will fasten to a pole and yet permit those controls to be carried down the pole without obstruction to moss sliding down the pole, and so that the housing will hold an extension on the end away from the pole.

Still another object of my invention is to provide a gathering head having a gathering pin operated by internal controls to retract from an extended or gathering position to a non-gathering position substantially countersunk below the surface of the housing, the gathering pin being so guided that it moves to retracted position without yawing.

Other objects and advantages of my invention will be apparent from consideration of the further and more detailed description and by reference to the accompanying drawings, in which:

Fig. 1 is a side elevation view of the entire gathering device except for lengths of the pole and the hand grip that have been cut away;

Fig. 2 is an enlarged section of the gathering head portion looking in the same direction as in Fig. 1;

Fig. 3 is a greatly enlarged section taken along the line 3—3 of Fig. 2 looking in the direction of the arrows;

Fig. 4 is an enlarged section taken along the line 4—4 of Fig. 2 looking in the direction of the arrows;

Fig. 5 is a portion of Fig. 4 exaggerated to show a detail of the gathering pin mounting;

Fig. 6 is a greatly enlarged view of the gathering pin shown in Fig. 2, but looking in the direction of the aperture in the housing;

Fig. 7 is a greatly enlarged portion of Fig. 2 showing a detail of the hand grip.

Fig. 8 is a greatly enlarged section taken along the line 8—8 of Fig. 2 looking in the direction of the arrows;

Fig. 9 is a reduced section of the housing extension shown in Fig. 1 and partially shown in section in Fig. 2;

Figure 10A:
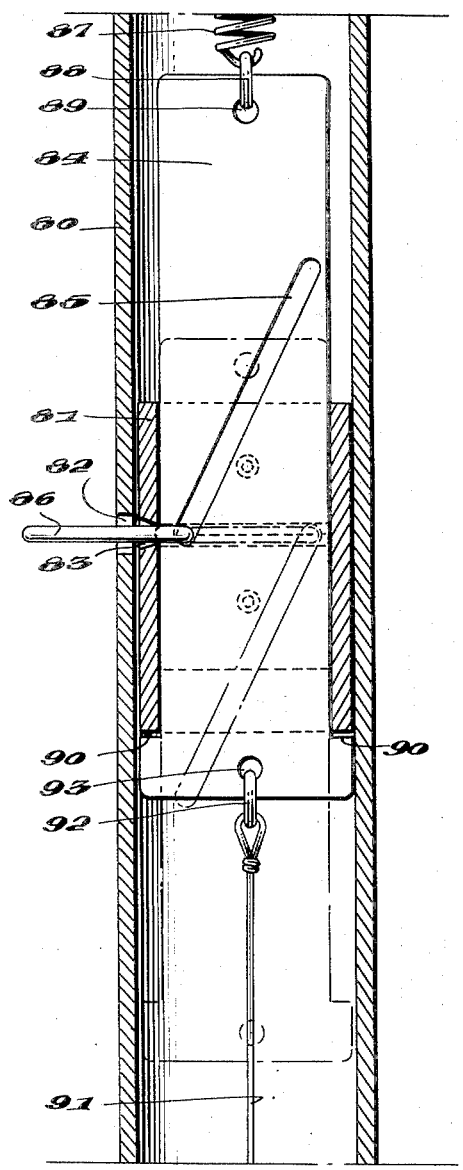
Figure 10B:
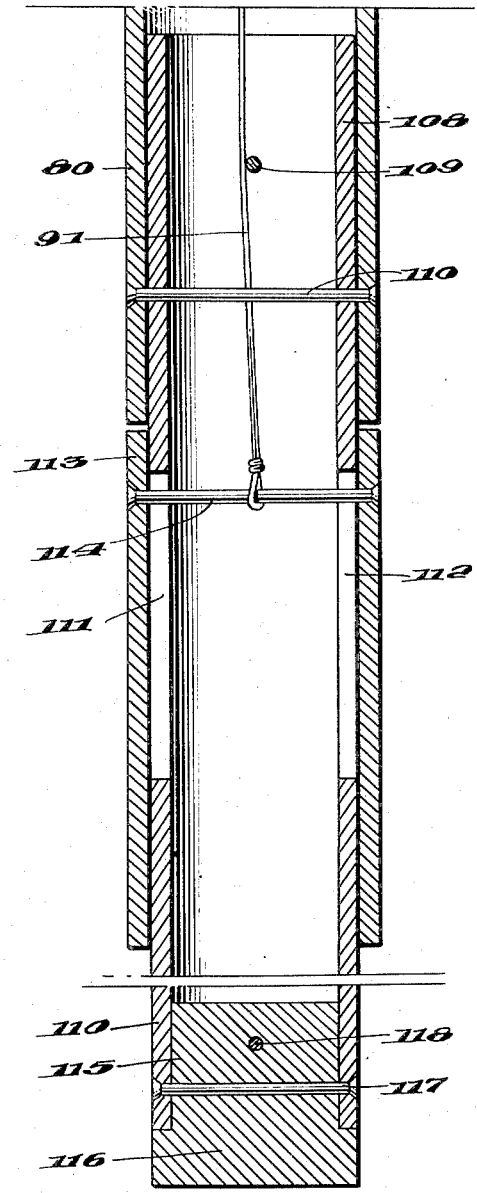

Figs. 10a, 10b, and 10c are fragments of a continuation axial section showing a variation of my gathering device; Figs. 10a, 10b, and 10c showing respectively the gathering pin portion, the hand control portion, and the outer end portion above the gathering pin;

Fig. 11 shows a vertical section of the gathering pin portion taken at right angles to the section of Fig. 10a;

Fig. 12 is a section taken along the line 12—12 of Fig. 11 looking in the direction of the arrows and showing the gathering pin;

Fig. 13 is a section taken along the line 13—13 of Fig. 11 looking in the direction of the arrows;

Fig. 14 is a section taken along the line 14—14 of Fig. 11 looking in the direction of the arrows; and Fig. 15 is an exploded view of the gathering pin sub-assembly shown in Figs. 10a and 11.

Briefly stated, my invention consists of a shaft having a normally extended but retractable gathering pin near one end and a control near the other end for retracting the gathering pin, the entire shaft and control, during a retraction-extension cycle, affording unimpeded passage of a coil of moss from the gathering pin past the base of the shaft.

Definitions that add convenience of description are given below:

Run-up length—the distance from the gathering pin to the near (or upper) end of the shaft, being the part on which the moss streamer appears to "run up" when being wound on the raised shaft. Run-up length omits any pointed taper at the upper end of the shaft because moss does not "run-up" on it.

Control length—the distance from the gathering pin to the hand-grip part of its control that is manipulated by direct hand contact.

Operating length—the distance from the gathering pin to the butt end of the shaft.

Over-all length—the entire length of the fibre gathering device from the butt end of the shaft to the other end, including any pointed part.

Spindle—that part of the shaft designed to wind moss about itself. The spindle includes all of the run-up length on the shaft plus a short distance below the gathering pin to accommodate the full width of a moss streamer.

Housing—that part of the shaft that houses the retracted gathering pin, the retracting mechanism and its junction with an exposed pull sleeve.

The retractable gathering pin is housed in a gathering head in such a way that the gathering pin may extend outward from the head, and when so controlled recess sufficiently far within the head to release its grip upon any fibres twisted around the head. This housing (which may or may not be integral with the remainder of the shaft) extends above the gathering pin with at least the same diameter as it has at the pin. If the housing does not provide sufficient run-up length a special extension piece is attached having at least the same diameter as the housing where it is attached.

The part of the shaft just below the housing (which may or may not be integral with the housing) is made to have the same diameter as the housing or alternatively a smaller diameter. The resulting lack of exposed ledges permits a streamer of moss that has been partially twisted around the spindle to slide on the pole by gravity when the gathering pin is retracted.

The gathering pin may be guided within the gathering head along a grooved track or in an arcuate path about a pivot. The retracting mechanism within the gathering head may be a biased cam or a biased lever. The remote hand control may operate the retracting mechanism by means of a shielded pull wire or by means of a flexible, exposed pull member that presents non-impeding contours to the coil of moss.

The diameter of the gathering head or housing should be as small as consistent with efficient housing of the gathering pin and its retracting mechanism. The remainder of the spindle above the housing may be cylindrical or may show moderately increasing diameters as measured upward away from the housing.

Run-up length should be at least 10 times the diameter of the gathering head with a length of 20 times this diameter showing up best in trials. Efficiency falls off more and more rapidly below a 20 to 1 ratio and is prohibitively low below a 10 to 1 ratio. Assuming an entirely cylindrical spindle and ignoring the width of a moss streamer, certain calculations can be made for a spindle axis 30 degrees out of line with a moss streamer. A run-up length of 10 times diameter gives 0.9 of a turn on the spindle. A run-up length of 20 times diameter gives 1.8 turns on the spindle.

In actual practice with such a length ratio an operator can reach upward more nearly vertical than 30 degrees and still wind moss on the spindle. After the gathering pin begins to engage he can move the shaft so that the moss streamer is strung out away from a vertical position and capable of winding properly on the spindle. Bending of the limb and stretching of the moss streamers will usually allow this without further raising of the shaft.

Nearly all moss streamers will pull loose from the branch with less than 30 pounds of pull, most of them requiring about 20 pounds. This is a matter of the number of long vertical fibres extending through the streamer at the point where it parts and the character of support from the limb that may allow fibres to be separated a few at a time or be sheared. The most usual moss streamers encountered in tests have from twenty to fifty through fibres and were spread to an average horizontal cross section of from 2 x 4 inches to 4 x 6 inches approximately. The most usual streamers encountered were from 3 to 6 feet in length.

Housing diameter should be kept as small as practicable because the required ratio of run-up length to housing diameter can be maintained with a spindle of reasonable length. A spindle of say 1½ inches in diameter should provide a run-up length of 30 inches (20 to 1 ratio). A spindle of 3 inches in diameter with a run-up length of 60 inches would be ineffective in many cases because some moss streamers are shorter than that. Furthermore, such a long run-up length would mean a loss of working height for the same over-all length. With a 3 inch diameter spindle and a 30 inch run-up length many streamers would fail to be pulled unless the shaft were held at such a low angle that more than 30 inches in working height would be loss (assuming a 20 foot over-all length).

Friction of the moss coiled around spindle is necessary to pull most of the moss fibres instead of just those that one or several gathering pins might engage. By winding the moss around the spindle friction surface is increased in somewhat the same way that an anchor line can be snubbed by a turn around a capstan. When the axis of a 1½ inch spindle is of the order of 70 degrees or more away from the long dimension of the moss streamer, three quarters of a turn of moss will entangle it with itself and grip the spindle more effectively. However, where such angle is 55 degrees or less, as would usually be the case, the moss would not entangle itself and friction with the surface of the spindle is roughly proportionate to the number of degrees coiled.

Experiments show that a spindle rotating at 55 degrees to 30 degrees relative to the moss streamer will provide an average of about 60% increase in pull for each quarter turn. If the gathering pin can exert a 2 pound pull, there should be after 1½ turns an approximately 30 pound pull on the streamer. Increases in diameter of spindle do not improve the average increase per quarter turn by a worthwhile amount. An eight inch diameter spindle at 45 degrees relative to the moss streamer appeared to give an 80% increase in pull per quarter turn. In view of the weight and the run-up length required to make such a spindle effective it would not be useful.

The tapered or sharpened end of the shaft above the spindle merely allows the gathering device to pass through moss and vegetation more easily. It does not serve to wind moss about it. In fact, this tapered portion should not have a design much more pointed than shown. Otherwise, when using the shaft in a somewhat horizontal position, the moss might coil about the tapered portion and thus be prevented from sliding down the shaft.

One of the preferred embodiments of my invention has a housing attached to a pole and in turn holding an extension piece. This embodiment as shown in Fig. 1 consists of a housing or gathering head 19 with gathering pin 20, housing 19 being attached to a pole 21 and carrying at its opposite end the extension 22.

Slidably fitting around pole 21 is sleeve 23, which extends from within housing 19 to down near the butt of the pole 21. As shown in Fig. 1, the pole and sleeve are broken away near the housing and the pole alone is again broken away near its butt end. As an example, dimensions may be given as follows:

Housing, outside diameter—1½ inches
Housing, length—15 inches
Housing, distance from gathering pin to end at extension—3 inches
Extension, length from housing to taper—27 inches
Pole, length below housing—16 feet
Pole, diameter at base of housing—¾ inch less than inside diameter of housing
Sleeve, length below housing—13½ feet The dimensions given in the example above are not critical except as they affect the run-up length.

The pole and the sleeve are shown perfectly cylindrical for simplicity in illustration, although as a practical matter poles usually are of larger diameter at the base end. Because the coil of moss must be free to slide down the pole, the base of the pole should not be more than slightly larger in diameter than the housing or gathering head. Nor should the sleeve cause the coil of moss to slide over a portion of greater diameter than the gathering head. Note that a sleeve of uniform diameter may still conform to all parts of a tapered pole by wrinkling. Since the most suitable poles, such as bamboo, sometimes involve a base slightly larger than the gathering head, it is often expedient to depend upon a shake of the pole or a push of the hand to get the coil of moss off the pole as it comes past the upper hand.

As shown in Figs. 1 and 2, housing 19 consists of a rigid tube 24 having a pin aperture 25 that permits the outer curved portion 26 of the gathering pin 20 to extend away from the axis of the tube 24 and slightly toward the pole 21.

As shown in Figs. 2 and 4, the gathering pin 20 pivots about a pivot pin 27 which extends across the tube 24 off center in relation to the tube. The holes in tube 24 that carry pivot pin 27 are bevelled away from the center of the tube beginning half-way from the outside of the tube.

As shown in Fig. 5, the pivot pin 27 is inserted across the tube with the split ends of the pivot pin together, as shown by dot-dash lines. The longer split end 28 remains straight but the shorter split end 29 is bent to the solid line position shown in Figs. 4 and 5, where it rests against the bevelled surface 30 of the hole 31. Trunnion 32 is held in position longitudinally in the center of pivot pin 27 by means of pinch sleeve 33 which has a pinched-in portion 34 engaging the hollowed out portion 35 of pivot pin 27. Trunnion 32, preferably bent out of a single rectangular sheet of metal has two holes 36 and 37 fit around the pivot pin 27 and a center hole 38 which carries lever bolt 39.

Referring to Figs. 2, 4, and 6, gathering pin 20 has an end loop 40 surrounding lever bolt 39 and pressed between trunnion 32 and washer 41, which are in turn gripped by the head 42 of lever bolt 39 and lock nuts 43 and 44. Lever bolt 39 has a hole 45 drilled near its small end and parallel to the axis of pivot pin 27. Gathering pin 20 has a middle loop 46 shown in Figs. 2 and 6 which acts as stop block to prevent excessive retraction of the curved portion 26 of the gathering pin 20.

Coil compression spring 47 backed against the inside of the tube 24 grips the middle loop 46 of the gathering pin 20 and biases the gathering pin 20 to its extended position. The retracted position of gathering pin 20 is shown in dot-dash lines of Fig. 2.

Fitting through hole 45 of lever bolt 39 is ring 48 to which pull cords 49 through 52 (shown in Figs. 2 and 3) are suitably tied so that a pull on the pull cords will cause the entire gathering pin assembly to move to the dot-dash line position as shown in Fig. 2. Guide rod 53 helps to align the lower part of pull cords 50 and 52 with the direction of pull from below. As shown in Figs. 2 and 3, pull cords 49 through 52 pass between the pole 21 and the tube 24, and between rivets 54 through 57. These pull cords are suitably attached to pull sleeve 23 as shown in Figs. 2, 3, and 7 by means of grommets 58 through which the ends of branch cords 49 through 52 are run and tied. The length of the tube 24 of gathering head 19 below the lowest rivet 57 is such that sleeve 23 may move from its upper (extend-the-pin) position to its lower (withdraw-the-pin) position without exposing grommets 58 to entanglement by moss.

The extension 22 fitting on the end of the gathering head 19 away from the pole 21 is shown in detail in Fig. 9. The extension 22 has a hollowed out portion 59 to decrease weight, a tapered upper portion 60 to facilitate its entry into a clump of moss, and a reduced diameter portion 61 for fitting within the tube 24 of gathering head 19. Rivet holes 62 and 63 are shown in Figs. 8 and 9 permit rivets 64 and 65 to pass through the cut down portion 61 of the extension 22 and through corresponding holes in the tube 24 thus holding the extension firmly to the tube.

Another preferred embodiment of my gathering device has a single tube that not only acts as a spindle but also serves as a housing and provides the control length. This embodiment is shown in Figs. 10a, 10b, 10c and 11 through 15.

A cross-sectional view taken along the axis of the device is represented completely by Figs. 10a, 10b and 10c except for routine portions of its length. Tube 80 extends all the way between hand grip assembly of Fig. 10b and the cap assembly of Fig. 10c, acting as a housing for the cam plate assembly of Fig. 10a. Hence in this embodiment the housing, the extension, and most of the operating length are supplied by tube 80.

As an example, dimensions may be given as follows:

Tube, outside diameter—1½ inches
Tube, length from cap to gathering pin—30 inches
Tube, length from gathering pin to hand grip—14½ feet
Neck tube, length below tube—2½ feet Referring to Figs. 10a and 11, assembly tube 81 fits within tube 80 so that aperture 82 of tube 80 coincides as nearly as possible with aperture 83 of assembly tube 81. Cam plate 84 having cam slot 85 holds gathering pin 86 in extended position as shown in solid lines. Tension spring 87 hooking on to ring 88 which passes through hole 89 of cam plate 84 biases cam plate 84 to the solid line position in which further movement is arrested by stop shoulders 90 of cam plate 84. Pull wire 91 is tied to ring 92 which passes through hole 93 of cam plate 84. Hence, a pull on pull wire 91 sufficient to overcome tension spring 87 will move cam plate 84 to the position indicated in Fig. 10a by dot-dash lines, in turn withdrawing gathering pin 86 to its retracted position (also indicated by dot-dash lines). When gathering pin 86 is in retracted position, its outer tip is countersunk in apertures 82 and 83.

As shown in Figs. 10a and 11 through 15, gathering pin 86 is guided in its path by grooves 94 of guide blocks 95 through 98, which are identical except for their position and orientation. Referring to Figs. 10a, 11 and 12 and especially to Fig. 12, gathering pin 86 has a hooked section 96 which passes through cam slot 85 and rides in part between the grooves 94 of guide blocks 95 and 97. The straight portion of gathering pin 86 rides similarly between the grooves 94 of guide blocks 96 and 98. The effect of all four grooves 94 together with aperture 83 of assembly tube 81 is to hold gathering pin 86 in its path and to hold it against yawing as well. It should be noted that while the inner edge of aperture 83 holds gathering pin 86 fairly snugly, the remainder of aperture 83 is bevelled to facilitate assembly.

The retracted position of gathering pin 86 is shown by dot-dash lines in Fig. 10a. Cam plate 84 is guided between assembly tube 81 and guide blocks 95 through 98.

As shown in Figs. 11, 13, and 15, guide blocks 95 through 98 are held firmly to assembly tube 81 by means of suitable screws 99 passing through suitable bevelled holes 100 and 101 in assembly tube 81.

As shown in Figs. 11 and 14, assembly rivet 102 passes across tube 80 and assembly tube 81 transverse to both tubes but on a line parallel to and to one side of cam plate 84. Assembly rivet 102 passes through suitable holes 103 and 104 of assembly tube 81 and tube 80 respectively.

The hand grip assembly of Fig. 10b shows neck tube 108 fitting for a portion of its length within tube 80 and suitably joined to it by rivets 109 and 110. Neck tube 108 has longitudinal slots 111 and 112 of a length approximately equivalent to the longitudinal component of cam slot 85. Hand grip 113 is tubular and fits slidably around neck tube 108. Thwart pin 114 extends across neck tube 108 and through slots 111 and 112 and is joined to pull wire 91 by a suitable loop. Hand grip 113 moves away from the cam plate assembly to move gathering pin 86 to its retracted position. Neck tube 108 receives the reduced diameter portion 115 of base plug 116 and is suitably attached to it by means of rivets 117 and 118.

As shown in Fig. 10c, tube 80 receives the reduced diameter portion 120 of cap 121. Screw eye 122 furnishes support for one end of tension spring 87 which acts to hold cap 121 in place.

It should be understood that in order to reduce weight, the second embodiment of my fibre gathering device can have a large portion of its tube replaced by tubing having thinner walls than required for supporting the cap assembly, the cam plate assembly, or the hand grip assembly.

Either type of retracting mechanism illustrated and described in this specification may be mounted on a pole and operated by a pull sleeve, either type may be joined to a long tube having a sliding hand grip for operating the retracting mechanism, and either type of retracting mechanism may be used as a spindle.

More than one gathering pin or more than one retracting mechanism may be provided in one fibre gathering device.

It will be further understood that I do not wish to be limited in my claims to the details of construction illustrated and described in this specification. For example, brazing or welding may be used in place of riveting. Other biasing means such as rods or pistons or bellows may be used instead of pull controls operated against spring tension. The retracting pin may describe an arc in another plane or move in a straight path not entirely perpendicular to the axis of the pole. The spindle may increase slightly in diameter above the gathering pin and may form an inverted, small angled, truncated cone or ball.

In operation, the user, holds the shaft upward at any convenient angle so that the gathering pin can touch the side of a pendant of Spanish moss. He then twists the shaft until the moss has been wound as far as possible around the spindle. Further twisting after the moss streamer has run off the spindle makes the streamer more like a rope and less likely to pull apart in the middle. Then the operator pulls the shaft downward and toward him to tear the moss away from the limb. Having a higher hold on the shaft, the operator may now pull downward on the pull sleeve (or the hand grip if the second embodiment is referred to) relative to the shaft, thus completely retracting the gathering pin. Usually the moss slides down the shaft immediately after the gathering pin is retracted. In some cases the shaft must also be given a slight oscillation about its axis in order to start the moss. When the moss slides as far as the operator's hands, the can let the moss slide off the butt end of the shaft by removing one hand at a time momentarily.

An advantage characteristic of both embodiments illustrated and described in this specification is that the gathering pin does not yaw when retracting. This avoids clamping the fibres against the outside of the housing with consequent jamming of the mechanism or pulling of fibres into the housing.

Another advantage of these fibre gatherers is that Spanish moss may be wound on the spindle, pulled loose from the limb, and made to slide down the shaft in almost the same motion used with poles with fixed gathering pins. With my fibre gatherers, unloading of the shaft takes place with only slight additional motion. The operator must give a slight downward pull on the pull sleeve or on the hand grip and then remove his hands one at a time, top hand first, to let the coil of the moss slide off the pole. By comparison, clearing moss from a hand pole with a fixed gathering pin requires complete lowering of the pole and unwinding or tearing loose by hand.

Another advantage of these fibre gatherers is that they may be used in almost vertical position due to the adequate run-up length above the gathering pin which allows moss to wind around and grip before running off the spindle.

An advantage of the above embodiments of housing, gathering pin, and retracting mechanism is that they can be mounted on a readily obtainable pole and have attached a pull sleeve for not only operating the mechanism but also for deflecting coils of moss over any irregularities in the pole.

Having thus described my invention, what I claim as novel and desire to secure by Letters Patent of the United States is:

1. A device for gathering Spanish moss or the like comprising a shaft, said shaft including a housing formed with a lateral opening; a gathering pin mounted within said housing for movement through said lateral opening, the run-up length from the gathering pin to the upper end of the shaft being 10 to 20 times the diameter of shaft above the gathering pin; and operating means connected with the gathering pin and extending therefrom to the intermediate portion of the shaft for controlling the extension and retraction of said pin through the opening of said housing.

2. A device for gathering Spanish moss or the like comprising a shaft, said shaft including a housing formed with a lateral opening; a gathering pin mounted within said housing for movement through said lateral opening, the run-up length from the gathering pin to the upper end of the shaft being 10 to 20 times the diameter of the shaft above the gathering pin; biasing means within said housing constructed and arranged for normally maintaining said pin extending from said housing; and operating means connected with the biasing means and extending therefrom to the intermediate portion of the shaft, said operating means including a hand grip in the form of a sleeve sliding on the shaft and constructed and arranged for unimpeded passage of a coil of moss or the like thereover down the shaft.

3. A device for gathering Spanish moss or the like comprising a pole, a tubular housing member connected with one end of the pole as an extension thereof, said housing member being formed to provide a lateral opening; a gathering pin mounted within said housing member for movement through said lateral opening; biasing means within said housing member constructed and arranged for normally maintaining said pin extended from said housing member; operating means associated with the biasing means and extending therefrom through the housing member to the intermediate portion of the pole for retracting said gathering pin; and an elongated gathering head forming an upward continuation of said housing member, the run up length from the gathering pin to the outer end of the gathering head being 10 to 20 times the diameter of the housing member above the gathering pin, said housing member and elongated gathering head providing a spindle about which moss or the like may be wound before being pulled loose.

4. A device for gathering Spanish moss or the like comprising a pole; a tubular gathering spindle extending over one end of said pole and secured thereto in spaced relation, said tubular spindle having a lateral opening intermediate its length; a gathering pin mounted within the tubular spindle and constructed and arranged for extensile and retractile movement through said lateral opening; biasing means arranged within the tubular spindle to extend the gathering pin outwardly of the gathering spindle; a sleeve slidably fitted over the pole and extending from an intermediate portion thereof into the tubular gathering spindle; and means including a flexible cord extending within the tubular spindle and connecting the gathering pin with the upper end of the sleeve for retracting said gathering pin, the overlapping of the sleeve by the gathering spindle permitting unimpeded passage of a coil of moss or the like down the pole.

5. A device for gathering Spanish moss or the like comprising a pole; a tubular gathering spindle extending over one end of said pole and secured thereto in spaced relation, said tubular spindle having a lateral opening intermediate its length; a gathering member pivotally mounted within the tubular spindle and having a hook portion constructed and arranged for extensile and retractile movement through said lateral opening; a spring arranged within the tubular spindle to extend the hook portion outwardly of the gathering spindle; a sleeve fitted loosely over the pole and extending from an intermediate portion thereof into the tubular gathering spindle; and means including a flexible cord extending within the tubular spindle and connecting the pivotally mounted gathering member with the upper end of the sleeve for retracting the hook portion, the overlapping of the sleeve by the gathering spindle permitting unimpeded passage of a coil of moss or the like down the pole.

6. The sub-combination comprising a tubular fibre gathering spindle adapted to extend over one end of a pole and to be secured thereto in spaced relaton, said tubular spindle having a lateral opening intermediate its length; a gathering member pivotally mounted within the tubular spindle and having a hook portion constructed and arranged for movement through said lateral opening; a spring arranged within the tubular spindle to extend the hook portion outwardly of the gathering spindle; an elongated, flexible sleeve adapted to slide loosely over the pole and extending from within the tubular gathering spindle; and means including flexible cords extending within the tubular spindle and connecting the pivotally mounted gathering member with the upper end of the sleeve for retracting the hook portion.

7. A device for gathering Spanish moss or the like comprising a shaft including a base tube and a housing tube formed with a lateral opening and secured over the upper end of the base tube; a gathering pin mounted within said housing tube for movement through said lateral opening, the run-up length from the gathering pin to the upper end of the housing tube being 15 to 30 inches; biasing means within said housing tube constructed and arranged for normally maintaining said pin extended from said housing tube; an operating sleeve sliding on the base tube and constructed and arranged for unimpeded passage of a coil of moss or the like thereover down the shaft; and means connecting the upper end portion of the sleeve with the biasing means, the upper end portion of the sleeve extending at least as far as the lower end of the housing tube when the gathering pin is retracted.

8. A device for gathering Spanish moss or the like comprising a base tube; a gathering spindle and housing tube secured over the upper end of the base tube, said spindle and housing tube having a lateral opening intermediate its length; a sliding plate having a cam slot inclined toward said lateral opening mounted within the spindle and housing tube; a gathering pin mounted within the spindle and housing tube for movement through said lateral opening, said pin having an inner portion in sliding engagement with said cam slot; a tapered cap on the outer end of the spindle and housing tube; a coil spring connected to said cap by one end and to the adjacent end of the sliding plate by the other end; a rigid sleeve of no greater external diameter than the lower end of the spindle and housing tube slidable over the base tube, and connecting means of fixed length secured to said sleeve and the sliding plate, said spring and said connectting means being enclosed by said tubes.

9. The sub-combination comprising a tube, said tube providing a fibre gathering spindle and a housing adapted to extend over one end of a tubular pole; a sliding plate having a cam slot inclined toward said lateral opening mounted within said tube; a gathering pin mounted within said tube for movement through said lateral opening, said pin having an inner portion in positive sliding engagement with said cam slot; and a spring anchored in the outer spindle portion of said tube and connected to the upper end of the sliding plate; the lower end of the sliding plate being formed to provide a connection with a pull wire extending inside said tube.

10. A device for gathering Spanish moss or the like comprising a shaft, said shaft including a housing formed with a lateral opening, a gathering pin mounted within said housing for movement through said lateral opening, operating means connecting with the gathering pin for actuating said gathering pin, a hand controlled member at an intermediate portion of said shaft and movable relative to said shaft, connecting means between said member and said operating means by which said member controls said operating means, the assembly of said hand controlled member and connecting means and the operating length of said shaft being formed and arranged to present only such rigid surfaces that are vertical or reentrant when said shaft is vertical and said housing is positioned near the top end of said shaft.

WILLIAM H. DRAKE.

REFERENCES CITED

The following references are of record in the file of this patent:

UNITED STATES PATENTS

| Number | Name | Date |
|---|---|---|
| 2,322,164 | Scudder | June 15, 1943 |